United States Patent

Tanimura et al.

[11] Patent Number: 5,958,574
[45] Date of Patent: Sep. 28, 1999

[54] POLYOLEFIN RESIN COMPOSITION AND ORIENTED FILM THEREFROM

[75] Inventors: Hiroyuki Tanimura; Takeshi Ebara, both of Chiba; Kazuhiro Yamazaki, Ehime; Taiji Yamada, Ehime; Tuyoshi Hashimoto, Ehime, all of Japan

[73] Assignee: Sumitomo Chemical Company, Limited, Osaka, Japan

[21] Appl. No.: 08/808,984

[22] Filed: Feb. 20, 1997

[30] Foreign Application Priority Data

Feb. 20, 1996 [JP] Japan .................................. 8-031940

[51] Int. Cl.$^6$ .............................. B32B 5/16; C08L 23/02; C08L 23/10
[52] U.S. Cl. .............................. 428/327; 428/910
[58] Field of Search .............................. 525/227; 428/327, 428/910

[56] References Cited

U.S. PATENT DOCUMENTS

| Re. 34,742 | 9/1994 | Maier et al. | 428/327 |
|---|---|---|---|
| 4,994,312 | 2/1991 | Maier et al. | 428/327 |
| 5,077,129 | 12/1991 | Schinkel et al. | 525/227 |
| 5,143,765 | 9/1992 | Maier et al. | 428/327 |
| 5,275,854 | 1/1994 | Maier et al. | 428/327 |
| 5,639,537 | 6/1997 | Ebara et al. | 525/327 |

FOREIGN PATENT DOCUMENTS

| 0 718360A1 | 6/1996 | European Pat. Off. . |
|---|---|---|
| 4-189937 | 7/1992 | Japan . |
| 05214120 | 8/1993 | Japan . |
| 6-107868 | 4/1994 | Japan . |
| 07178805 | 7/1995 | Japan . |
| 07196819 | 8/1995 | Japan . |
| 07196820 | 8/1995 | Japan . |

Primary Examiner—Donald R. Wilson
Attorney, Agent, or Firm—Birch, Stewart, Kolasch & Birch, LLP

[57] ABSTRACT

A polyolefin resin composition comprising (a) 100 parts by weight of a polyolefin resin and (b) 0.05 to 1 part by weight of beads of a crosslinked polymer comprising (1) 5 to 99% by weight of a radically polymerizable monomer unit represented by the general formula (A):

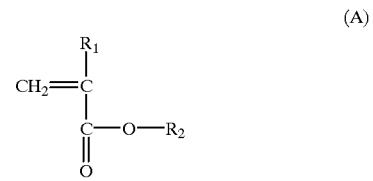

wherein $R_1$ is hydrogen or a hydrocarbon group having 1 to 5 carbon atoms and $R_2$ is a hydrocarbon group having 5 to 30 carbon atoms, (2) 0 to 94% by weight of a radically polymerizable monomer unit other than the monomer unit of the general formula (A), and (3) 1 to 20% by weight of a crosslinkable monomer unit, said crosslinked polymer beads having a critical surface tension of 40 dyne/cm or less.

13 Claims, No Drawings

POLYOLEFIN RESIN COMPOSITION AND ORIENTED FILM THEREFROM

BACKGROUND OF THE INVENTION

1. Field of the Invention

The present invention relates to a polyolefin resin composition suitable for producing effectively an oriented polyolefin resin film which is excellent in transparency, slipperiness and antiblocking property, and an oriented polyolefin resin film using the same.

2. Prior Arts

Oriented polyolefin resin films, especially oriented polypropylene films, have found application in food packing, fiber packing and other wide purposes because of their excellent transparency and mechanical properties. These excellent oriented polypropylene films have, however, not been free from fault; when the films are overlapped, they adhere to with each other causing the so-called blocking phenomenon and therefore cause a problem in that the packing-work efficiency is significantly lowered.

Conventionally, methods have been proposed in which a fine powdery inorganic substance as an antiblocking agent (hereinafter referred to as "ABA") is added to a polypropylene, the mixture is kneaded and molded into a sheet followed by orientation in order to improve slipperiness and the antiblocking property of the oriented polypropylene resin film. Those methods include a method which adds zeolite, magnesium silicate or the like (for example, JP-B-53-16134 and JP-B-48-14423), and a method which adds fine powdery silica (for example, JP-B-63-58170 and JP-A-4-288353). Since, however, the fine powdery inorganic substances are easily agglomerated and the affinity between the polypropylene resin and the inorganic substance is insufficient, there is a problem in that voids are produced during orientation around the inorganic substance acting as a nucleus, resulting in inferior transparency represented by LSI (light scattering transmission intensity).

In order to improve the drawbacks of these films containing the fine powdery inorganic substance ABA, methods have been proposed in which oriented films are obtained after dispersing a fine powdery high molecular substance ABA in the polypropylene resin (for example, JP-A-57-64522, JP-A-5-214120, JP-A-6-107868, JP-A-7-178805, JP-A-7-196819 and the like). In these methods, however, LSI may become inferior because of voids produced during orientation and an insufficient affinity between the polypropylene resin and the high molecular substance ABA, or the transparency of the film represented by haze may become inferior because of a large difference in refraction index between the polypropylene resin and the high molecular substance ABA. Further, there is a problem in that antiblocking property of the oriented film is not sufficient because of an insufficient degree of crosslinking.

Under these circumstances, the present inventors have conducted extensive studies for improving slipperiness and the antiblocking property without accompanying significant damage regarding transparency. As the result, they have discovered that a polyolefin resin composition which meets the above requirement and an oriented film therefrom can be obtained by using as an ABA a crosslinked polymer bead having a specific structure and thus completed the present invention.

SUMMARY OF THE INVENTION

An object of the present invention is to provide a polyolefin resin composition which produces an oriented polyolefin resin film excellent in transparency, slipperiness and the antiblocking property, and the oriented film produced therefrom.

According to the present invention, there is provided a polyolefin resin composition comprising:

(a) 100 parts by weight of a polyolefin resin; and
(b) 0.05 to 1 part by weight of beads of a crosslinked polymer comprising (1) 5 to 99% by weight of a radically polymerizable monomer unit represented by the general formula (A):

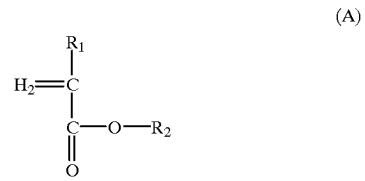

wherein $R_1$ is hydrogen or a hydrocarbon group having 1 to 5 carbon atoms and $R_2$ is a hydrocarbon group having 5 to 30 carbon atoms, (2) 0 to 94% by weight of a radically polymerizable monomer unit other than the monomer unit of the general formula (A), and (3) 1 to 20% by weight of a crosslinking monomer unit, said crosslinked polymer beads having a critical surface tension of 40 dyne/cm or less, the percentages being measured relative to the total weight of compoments (1), (2) and (3).

Further, the present invention provides an oriented polyolefin resin film obtained by orienting a sheet of said composition at least in a uniaxial direction.

DETAILED DESCRIPTION OF THE INVENTION

The present invention is described in detail below.

The polyolefin resin used in the present invention includes a crystalline homopolymer of, for example, propylene, ethylene, butene-1, hexene-1, 4-methylpentene-1 and the like, a crystalline copolymer of two or more kinds of these olefins or mixture of two or more kinds of these polymers, among which a crystalline polypropylene resin is preferred. The crystalline polypropylene resin used in the present invention is a known polymer mainly comprising propylene. Examples of such resin include a crystalline propylene homopolymer, a crystalline copolymer of propylene with one or more α-olefins, such as propylene-ethylene copolymer, propylene-butene-1 copolymer and propylene-ethylene-butene-1 terpolymer, and a mixture two or more thereof. Further, it is possible to optionally add to the polypropylene resin described above a polyolefin polymer such as a polyethylene resin, a polybutene-1 resin, a polystyrene resin, an ethylene-propylene copolymer rubber, an ethylene-propylene-diene terpolymer rubber or the like.

The crosslinked polymer beads used in the present invention are beads of a crosslinked polymer comprising (1) 5 to 99% by weight of a radically polymerizable monomer unit (hereinafter, abbreviated as "Unit (1)").

In the general formula (A), $R_1$ is hydrogen or a hydrocarbon group having 1 to 5 carbon atoms (e.g. an alkyl group), preferably hydrogen or a hydrocarbon group having 1 to 3 carbon atoms and more preferably hydrogen or methyl.

Also, $R_2$ is a hydrocarbon group having 5 to 30 carbon atoms, preferably a hydrocarbon group having 5 to 20 carbon atoms and more preferably a hydrocarbon group having 5 to 10 carbon atoms. The hydrocarbon group represented by $R_2$ includes generally an alkyl group, a cycloalkyl group, an arlyl group, an aralkyl group and the like. When $R_2$ is a hydrocarbon group having up to 4 carbon atoms or hydrogen, the transparency of the film obtained is inferior.

Specific examples of the monomer represented by the general formula (A) which gives the Unit(1) constituting the crosslinked polymer beads used in the present invention include pentyl acrylate, isopentyl acrylate, neopentyl acrylate, 2-methylbutyl acrylate, 3-methylbutyl acrylate, hexyl acrylate, 2-methylpentyl acrylate, 2-ethylbutyl acrylate, 1,3-dimethylbutyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, tridecyl acrylate, tetradecyl acrylate, 2-methyl-7-ethyl-4-undecyl acrylate, pentadecyl acrylate, hexadecyl acrylate, heptadecyl acrylate, octadecyl acrylate, nonadecyl acrylate, eicosyl acrylate, behenyl acrylate, phenyl acrylate, benzyl acrylate, tolyl acrylate, 2-tert-butylphenyl acrylate, 4-tert-butylphenyl acrylate, phenethyl acrylate, 2-naphthyl acrylate, 4-biphenyl acrylate, isobornyl acrylate, cyclohexyl acrylate, 3,3,5-trimethylcyclohexyl acrylate, 4-methylcyclohexyl acrylate, cyclododecyl acrylate, pentyl methacrylate, isopentyl methacrylate, neopentyl methacrylate, 2-methylbutyl methacrylate, 3-methylbutyl methacrylate, hexyl methacrylate, 2-methylpentyl methacrylate, 2-ethylbutyl methacrylate, 1,3-dimethylbutyl methacrylate, heptyl methacrylate, octyl methacrylate, isooctyl methacrylate, 2-ethylhexyl methacrylate, nonyl methacrylate, decyl methacrylate, isodecyl methacrylate, undecyl methacrylate, dodecyl methacrylate, tridecyl methacrylate, tetradecyl methacrylate, 2-methyl-7-ethyl-4-undecyl methacrylate, pentadecyl methacrylate, hexadecyl methacrylate, heptadecyl methacrylate, octadecyl methacrylate, nonadecyl methacrylate, eicosyl methacrylate, behenyl methacrylate, phenyl methacrylate, benzyl methacrylate, tolyl methacrylate, 2-tert-butylphenyl methacrylate, 4-tert-butylphenyl methacrylate, phenethyl methacrylate, 2-naphthyl methacrylate, 4-biphenyl methacrylate, isobornyl methacrylate, cyclohexyl methacrylate, 3,3,5-trimethylcyclohexyl methacrylate, 4-methylcyclohexyl methacrylate, cyclododecyl methacrylate, pentyl ethacrylate, isopentyl ethacrylate, neopentyl ethacrylate, 2-methylbutyl ethacrylate, 3-methylbutyl ethacrylate, hexyl ethacrylate, 2-methylpentyl ethacrylate, 2-ethylbutyl ethacrylate, 1,3-dimethylbutyl ethacrylate, heptyl ethacrylate, octyl ethacrylate, isooctyl ethacrylate, 2-ethylhexyl ethacrylate, nonyl ethacrylate, decyl ethacrylate, isodecyl ethacrylate, undecyl ethacrylate, dodecyl ethacrylate, tridecyl ethacrylate, tetradecyl ethacrylate, 2-methyl-7-ethyl-4-undecyl ethacrylate, pentadecyl ethacrylate, hexadecyl ethacrylate, heptadecyl ethacrylate, octadecyl ethacrylate, nonadecyl ethacrylate, eicosyl ethacrylate, behenyl ethacrylate, phenyl ethacrylate, benzyl ethacrylate, tolyl ethacrylate, 2-tert-butylphenyl ethacrylate, 4-tert-butylphenyl ethacrylate, phenethyl ethacrylate, 2-naphthyl ethacrylate, 4-biphenyl ethacrylate, isobornyl ethacrylate, cyclohexyl ethacrylate, 3,3,5-trimethylcyclohexyl ethacrylate, 4-methylcyclohexyl ethacrylate, cyclododecyl ethacrylate and the like. Among them, 2-ethylhexyl acrylate, 2-ethylhexyl methacrylate, pentyl methacrylate, hexyl methacrylate, heptyl methacrylate, octyl methacrylate, nonyl methacrylate, isodecyl methacrylate, phenyl methacrylate, cyclohexyl acrylate, octadecyl methacrylate are preferred and 2-ethylhexyl acrylate and 2-ethylhexyl methacrylate are particularly preferred. These can be used alone or in combination of 2 or more.

The crosslinked polymer beads used in the present invention comprise 5 to 99% by weight, preferably 5 to 80% by weight and particularly 5 to 60% by weight of the Unit (1).

When the Unit (1) in the crosslinked polymer is more than 99% by weight (the crosslinking monomer unit is less than 1% by weight), the antiblocking property lowers because the shape of the polymer beads can not be maintained during melt-extrusion with the polyolefin resin.

When the Unit (1) in the crosslinked polymer is less than 5% by weight, the transparency of the film becomes inferior.

One of the grounds for this result is production of voids during the orientation of the film because a sufficient affinity can not be obtained between the crosslinked polymer bead and the polyolefin resin.

The Unit (1) in the present invention has, in its structure, a hydrocarbon group having 5 to 30 carbon atoms, thereby giving a good affinity to the polyolefin resin and inhibiting production of voids.

The radically polymerizable monomer unit (hereinafter abbreviated as "Unit (2)") other than the monomer unit represented by the general formula (A) constituting the crosslinked polymer bead used in the present invention is not particularly limited.

Specific examples of the monomer which gives Unit (2) include styrenes such as styrene, methylstyrene, ethylstyrene, butylstyrene, propylstyrene, acrylates/methacrylates such as methyl acrylate, ethyl acrylate, propyl acrylate, butyl acrylate, methyl methacrylate, ethyl methacrylate, propyl methacrylate, butyl methacrylate, hydroxyethyl acrylate, hydroxyethyl methacrylate, hydroxypropyl acrylate, hydroxypropyl methacrylate, hydroxybutyl acrylate, hydroxybutyl methacrylate, dimethylaminoethyl acrylate, dimethylaminoethyl methylacrylate, cyanomethyl acrylate, cyanomethyl methacrylate, 2-methoxyethyl acrylate, 2-methoxyethyl methacrylate, sodium acrylate, sodium methacrylate, trifluoroethyl acrylate, trifluoroethyl methacrylate, trifluoroisopropyl acrylate, trifluoroisopropyl methacrylate and the like. Among them, styrene, methyl acrylate and methyl methacrylate are preferred. These can be used alone or in combination of 2 or more.

The crosslinked polymer beads used in the present invention comprise 0 to 94% by weight, preferably 0 to 85% by weight and particularly 0 to 75% by weight of the Unit (2). When the Unit (2) in the crosslinked polymer is more than 94% by weight, the transparency of the film becomes inferior because effect of the Unit (1) can not be suitably obtained. The monomer units (1) and (2) are non-crosslinking monomer units. Each preferably contains one radically polymerizable group.

The crosslinking monomer unit (3) constituting the crosslinked polymer beads used in the present invention is a radically polymerizable monomer having at least two vinyl groups. Concrete examples include divinylbenzene, ethylene glycol diacrylate, ethylene glycol dimethacrylate, trimethylolpropane triacrylate, trimethylolpropane trimethacrylate, pentaerythritol tetraacrylate, pentaerythritol tetramethacrylate, allyl acrylate, allyl methacrylate, 1,6-hexanediol diacrylate, 1,6-hexanediol dimethacrylate and the like. Among them, divinylbenzene, ethylene glycol dimethacrylate and trimethylol propane trimethacrylate+ are preferred and divinylbenzene is particularly preferred.

These monomers can be used alone or in combination of two or more.

The crosslinked polymer beads used in the present invention contains 1 to 20% by weight, preferably 2 to 15% by weight and particularly 2 to 10% by weight of crosslinking monomer unit (3). When the Unit (3) in the crosslinked polymer is less than 1% by weight, the antiblocking property lowers because the shape of the polymer bead can not be maintained during melt-extrusion with the polyolefin resin.

The critical surface tension (dyne/cm) of the crosslinked polymer beads used in the present invention is 40 dyne/cm or less, preferably 20 to 38 dyne/cm and particularly 25 to 35 dyne/cm. When the critical surface tension (hereinafter, referred to as "γc") is greater than 40 dyne/cm, a sufficient affinity can not be obtained between the crosslinked polymer beads and the polyolefin resin, and voids are produced during orientation of the film around the inorganic substance acting as a nucleus, resulting in inferior transparency represented by LSI.

The γc was defined by Zisman as a value for representing the surface tension of a solid.

Methods for experimentally determining γc are described in detail in Industrial and Engineering Chemistry, Vol.55, No.10, pages 19–38 (1963), or in I. Skeist (Ed.), "Handbook of Adhesives", Second Ed., Reinhold (1977).

The method for polymerization used for the production of the crosslinked polymer beads in the present invention is not particularly limited. There are usually adopted emulsion polymerization, dispersion polymerization, suspension polymerization, soap-free polymerization, seed polymerization, swelling polymerization or microsuspension polymerization. Among these, dispersion polymerization, suspension polymerization, seed polymerization, swelling polymerization and microsuspension polymerization are preferred and dispersion polymerization is particularly preferred.

The size of the crosslinked polymer beads is not particularly limited, but they usually have a weight average particle size of 0.5 to 5 $\mu$m and preferably of 0.8 to 3 $\mu$m. When the weight average particle size is too small, projections having a height sufficient for providing the antiblocking property can not be formed on the surface of the oriented film. On the other hand, when the weight average particle diameter is too large, voids may be liable to be formed because of interfacial separation caused by a stress concentration at the interface between the crosslinked polymer beads and the polyolefin during orientation of the film, or the transparency of the film may become inferior due to an action of the crosslinked polymer bead itself as a factor for light scattering.

The polyolefin resin composition of the present invention can provide an oriented polyolefin resin film excellent in the balance between the transparency and the antiblocking property without damaging outside appearance by using crosslinked polymer beads in the final addition concentration of 0.05 to 1 part by weight, preferably of 0.07 to 0.6 part by weight and more preferably of 0.08 to 0.5 part by weight per 100 parts by weight of the polyolefin resin.

In the present invention, a master batch containing 1–50 parts by weight of the crosslinked polymer beads per 100 parts by weight of the polyolefin resin may be prepared and used in an appropriate amount in order to obtain a prescribed crosslinked polymer bead concentration.

The method for adding the crosslinked polymer beads to the polyolefin resin is not limited insofar as it can uniformly disperse the crosslinked polymer beads, and suitable methods includes a method in which mixing is effected with a ribbon blender, a Henschel mixer or the like to give a mixture, which is melt-kneaded in an extruder. In this time, known antioxidants, neutralization agents, lubricants, antidropping agents, antistatic agents and the like may be optionally added.

The polyolefin resin composition obtained in this manner can be melt-extruded according to a known process, cooled to give a sheet and then the sheet is oriented at least in a uniaxial direction according to a known method to give an oriented film.

The thickness of the film of the present invention is not particularly limited but usually 200 $\mu$m or less, preferably 5–100 $\mu$m and more preferably 8–50 $\mu$m.

The present invention is described in more detail but the present invention is not limited thereto.

EXAMPLE

The measured data for various properties in the Detailed Description of the Invention and in Examples of the present invention were obtained by the following methods.

(A) Critical Surface Tension (γc) (unit: dyne/cm)

1) Preparation of a plate-like tablet of crosslinked polymer beads

A plate-like tablet was prepared by weighing 0.2 g of a crosslinked polymer beads and subjecting it to compression with a KBr tablet press generally used for IR measurement purpose to give a tablet having a diameter of about 13 mm and a thickness of about 1 mm. The compression was carried out at 400 kg/cm$^2$ for 5 minutes using a desk press manufactured by Shimadzu Corp.

2) Measurement of the contact angle (θ) (unit: degree)

The contact angle (θ) was measured for each of the liquids, shown below, having about 1 mm in diameter dropped from a syringe on the flat surface of the obtained tablet. The syringe was a 1 cc glass syringe 22G manufactured by Kyowa Kaimen Kagaku. The machine for measuring the contact angle was FACE contact angle meter manufactured by Kyowa Kaimen Kagaku. The measurement of the contact angle was carried out at 23° C. and in an atmosphere of 50% humidity.

The liquids for measuring the contact angle were reagents, shown below, manufactured by Kanto Kagaku.

Liquids for measuring the contact angle:

| Liquid | Surface Tension (γL) (dyne/cm) |
| --- | --- |
| glycerol | 63.4 |
| formamide | 58.2 |
| methylene iodide | 50.8 |
| tricresyl phosphate | 40.9 |

The surface tension (γL) was necessary for obtaining γc and cited from "Physical Chemistry of Adhesion, David H. Kaelble, John Wiley & Sons, Inc. (1971), page 158, Table 5-2".

3) Calculation of γc

The values of γc of the crosslinked polymer beads was obtained as the γL extrapolated for cos θ=1 (θ→0) in the linear approximation plotted with values of γL (dyne/cm) for the respective liquids shown above as abscissa against values of cos θ (degree) obtained from the contact angle (θ) for the respective liquids measured in 2) as ordinate.

(B) Weight average particle diameter (unit: $\mu$m)

Measurement was carried out with a light diffraction scattering particle diameter measuring machine (microtruck FRA) manufactured by Leeds & Northrup.

(C) Haze (unit: %) was measured according to ASTM D-1003.

(D) LSI (light scattering transmission intensity) (unit: %) was measured with an LSI tester (receiving scattering transmission light at ±0.4°–1.2°) manufactured by Toyo Seiki. Since LSI values fairly well correlated with the feeling of visual transparency, it was used as an indication for the feeling of transparency.

(E) Slipperiness

The coefficient of static friction ($\mu s$) and the coefficient of kinetic friction ($\mu k$) were measured according to ASTM D-1894.

(F) Antiblocking property (unit: kg/20 cm$^2$)

Films of 80 mm×120 mm in size were subjected to conditioning at 50° C. for 48 hours under a load of 2 kg putting them between glass plates with their corona-treated surfaces facing each other such that they overlapped over the length of 100 mm in the longitudinal direction. Then, they were allowed to stand at 23° C. for more than 30 minutes in an atmosphere of 50% humidity and cut at a width of 20 mm in the longitudinal direction to give samples, which were subjected to the shear tensile test at a rate of 200 mm/minute. Ten samples from the same film were measured 10 times in total and the average of 5 data was taken as the strength required for delamination of the sample excluding maximum 1 datum and minimum 4 data.

Example 1

(a) Preparation of Crosslinked Polymer Beads

Into a glass flask equipped with a stirrer were charged 40 parts by weight of a monomer mixture consisting of 60% by weight of 2-ethylhexyl acrylate, 30% by weight of styrene and 10% by weight of divinylbenzene, 200 parts by weight of ethanol, 1 part by weight of benzoyl peroxide and 1 part by weight of hydroxypropyl cellulose and, after dissolving, polymerization was carried out at 78° C. for 10 hours and then thus obtained polymer was dried to give crosslinked polymer beads. The composition, critical surface tension and weight average particle diameter of the obtained crosslinked polymer beads are shown in Table 1.

(b) Production of Oriented Film

In a Henschel mixer were mixed 100 parts by weight of propylene polymer powder having a melt index of 2.3 g/10 minutes, 1.0 part by weight of stearic acid ester of stearyl diethanolamine as an antistatic agent, 10 parts by weight as the solid content of the crosslinked polymer beads prepared in above (a), 0.1 part by weight of calcium stearate as a stabilizer, 0.2 part by weight of BHT (2,6-di-tert-butyl-4-hydroxytoluene) and 0.05 part by weight of Irganox 1010 (trade name of antioxidant manufactured by Ciba Geigy Limited) and the mixture was granulated and pelletized using a 40 mm$\phi$ extruder to give a master batch of the crosslinked polymer beads. Also, 100 parts by weight of propylene polymer powder having a melt index of 2.3 g/10 minutes, 2.0 parts by weight of stearic acid ester of stearyl diethanolamine, 0.1 part by weight of calcium stearate, 0.2 part by weight of BHT (2,6-di-tert-butylhydroxytoluene) and 0.05 part by weight of Irganox 1010 (trade name of antioxidant manufactured by Ciba Geigy Limited) were mixed in a Henschel mixer and the mixture was granulated and pelletized using a 65 mm$\phi$ extruder to give a master batch of antistatic agent.

Then, 48 parts by weight of polypropylene pellets (trade name: Sumitomo Noblen, grade: FS2011D manufactured by Sumitomo Chemical Co., Ltd.), 48 parts by weight of the above-described master batch of the antistatic agent and 4 parts by weight of the above-described master batch of the cross-linked polymer beads were mixed in a pellet blender and the mixture was melt extruded at a resin temperature of 260° C. and cooled rapidly with cooling rolls at 60° C. to solidify giving a sheet having a thickness of 0.8 mm. The sheet was oriented, after preheating, 5 times in the longitudinal direction at an orienting temperature of 145° C. utilizing the difference in peripheral speed of a longitudinal direction orienting machine, subsequently oriented 8 times in the crosswise direction at an orienting temperature of 157° C. with a tenter orienting machine, heat-treated at 165° C. to obtain an oriented film having a thickness of 20 $\mu$m, which was subjected to corona treatment at one side.

The results of evaluation of the film properties are shown in Table 2. In Table 2, the amount of ABA shows part by weight per 100 parts by weight of polypropylene.

Example 2

(a) Preparation of Crosslinked Polymer Beads

Crosslinked polymer beads were obtained in the same manner as in Example 1(a) except that a mixture of 60% by weight of 2-ethylhexyl methacrylate, 34% by weight of styrene and 6.0% by weight of divinylbenzene was used instead of the monomer mixture in Example 1 (a). The composition, critical surface tension and weight average particle diameter of the obtained crosslinked polymer beads are shown in Table 1.

(b) Production of Oriented Film

A master batch of the crosslinked polymer beads was obtained in the same manner as in Example 1 (b) using the crosslinked polymer beads obtained in (a) and an oriented film was obtained in the same manner as in Example 1 (b). The results of evaluation of properties of the obtained oriented film are shown in Table 2.

Example 3

(a) Preparation of Crosslinked Polymer Beads

Crosslinked polymer beads were obtained in the same manner as in Example 1 (a) except that a mixture of 5.0% by weight of 2-ethylhexyl methacrylate, 72% by weight of styrene, 19% by weight of methyl methacrylate and 4.0% by weight of divinylbenzene was used instead of the monomer mixture in Example (a). The composition, critical surface tension and weight average particle diameter of the obtained crosslinked polymer beads are shown in Table 1.

(b) Production of Oriented Film

A master batch of the crosslinked polymer beads was obtained in the same manner as in Example 1 (b) using the crosslinked polymer beads obtained in (a) and an oriented film was obtained in the same manner as in Example 1 (b) except that each 49 parts by weight of FS2011D and the antistatic master batch was used with respect to 2 parts by weight of the bead master batch. The results of evaluation of properties of the obtained oriented film are shown in Table 2.

Example 4

(a) Preparation of Crosslinked Polymer Beads

Crosslinked polymer beads were obtained in the same manner as in Example 1 (a) except that a mixture of 60% by weight of octadecyl methacrylate, 36% by weight of styrene and 4.0% by weight of divinylbenzene was used instead of the monomer mixture in Example 1 (a). The composition, critical surface tension and weight average particle diameter of the obtained crosslinked polymer beads are shown in Table 1.

(b) Production of Oriented Film

A master batch of the crosslinked polymer beads was obtained in the same manner as in Example 1 (b) using the crosslinked polymer beads obtained in (a) and an oriented film was obtained in the same manner as in Example 1 (b).

The results of evaluation of properties of the obtained oriented film are shown in Table 2.

Example 5
(a) Preparation of Crosslinked Polymer Beads

Crosslinked polymer beads were obtained in the same manner as in Example 1 (a) except that a mixture of 7.0% by weight of 2-ethylhexyl acrylate, 53% by weight of 2-ethylhexyl methacrylate, 34% by weight of styrene and 6.0% by weight of divinylbenzene was used instead of the monomer mixture in Example (a). The composition, critical surface tension and weight average particle diameter of the obtained crosslinked polymer beads are shown in Table 1.

(b) Production of Oriented Film

A master batch of the crosslinked polymer beads was obtained in the same manner as in Example 1 (b) using the crosslinked polymer beads obtained in (a) and an oriented film was obtained in the same manner as in Example 1 (b). The results of evaluation of properties of the obtained oriented film are shown in Table 2.

Comparative Example 1
(a) Preparation of Crosslinked Polymer Beads

Crosslinked polymer beads were obtained in the same manner as in Example 1 (a) except that a mixture of 96% by weight of styrene and 4.0% by weight of divinylbenzene was used instead of the monomer mixture in Example (a). The composition, critical surface tension and weight average particle diameter of the obtained crosslinked polymer beads are shown in Table 1.

(b) Production of an Oriented Film

A master batch of the crosslinked polymer beads was obtained in the same manner as in Example 1 (b) using 5 parts by weight as the solid content of the crosslinked polymer beads obtained in (a) and an oriented film was obtained in the same manner as in Example 1 (b) except that each 47 parts by weight of polypropylene pellet (FS2011D) and the antistatic master batch was used with respect to 6 parts by weight of the bead master batch. The results of evaluation of properties of the obtained oriented film are shown in Table 2.

In this case, since styrene alone was used as the radically polymerizing monomer unit constituting the crosslinked polymer beads, the haze of the film obtained was inferior while the critical surface tension was small and LSI was good.

Comparative Example 2
(a) Preparation of Crosslinked Polymer Beads

In to a glass flask equipped with a stirrer was charged 900 parts by weight of ion-exchanged water containing 0.5 part by weight of dissolved sodium dodecyl benzene sulfate and 100 parts by weight of a monomer mixture consisting of 90% by weight of methyl methacrylate and 10% by weight of trimethylolpropane trimethacrylate and 1 part by weight of azobisisobutyronitrile were added. The mixture was stirred at 8,000 rpm for 30 minutes with a T. K. Homomixer (manufactured by Tokushu Kika Kogyo K.K.) to give a uniform suspension. The suspension was heated to 75° C., polymerization was carried out for 5 hours, thus obtained polymerization mixture was cooled, filtered and dried to give crosslinked polymer beads. The composition, critical surface tension and weight average particle diameter of the obtained crosslinked polymer beads are shown in Table 1.

(b) Production of Oriented Film

A master batch of the crosslinked polymer beads was obtained in the same manner as in Example 1 (b) except using 5 parts by weight of the crosslinked polymer beads obtained in (a) and an oriented film was obtained in the same manner as in Example 1 (b) except that each 48 parts by weight of polypropylene pellet (FS2011D) and the antistatic master batch was used with respect to 4 parts by weight of the master batch of beads. The results of evaluation of properties of the obtained oriented film are shown in Table 2.

In this case, since the radically polymerizing monomer unit constituting the crosslinked polymer bead was methyl methacrylate, the critical surface tension was large and LSI was remarkably bad.

Comparative Example 3
(a) Preparation of Crosslinked Polymer Beads

Crosslinked polymer beads were obtained in the same manner as in Example 1 (a) except that a mixture of 24% by weight of styrene, 72% by weight of methyl methacrylate and 4.0% by weight of divinylbenzene was used instead of the monomer mixture in Example (a). The composition, critical surface tension and weight average particle diameter of the obtained crosslinked polymer beads are shown in Table 1.

(b) Production of an Oriented Film

A master batch of the crosslinked polymer beads was obtained in the same manner as in Example 1 (b) except using 5 parts by weight of the crosslinked polymer beads obtained in (a) and an oriented film was obtained in the same manner as in Example 1 (b) except that each 46 parts by weight of polypropylene pellets (FS2011D) and the antistatic master batch was used with respect to 8 parts by weight of the master batch of beads. The results of evaluation of properties of the obtained oriented film are shown in Table 2.

In this case, since Unit (1) was not used as the radically polymerizable monomer unit constituting the crosslinked polymer beads, the critical surface tension was large, LSI was remarkably bad, and further, the haze was inferior.

TABLE 1

| | Antiblocking agent (ABA) | | | | | | | |
|---|---|---|---|---|---|---|---|---|
| | Composition of crosslinked polymer bead | | | | | | | |
| | Radically polymerizable monomer unit (1) | | Radically polymerizable monomer unit (2) | | Crosslinking monomer unit (3) | | Critical surface tension (dyne/cm) | Weight average particle diameter (μm) |
| | Kind of monomer | (wt %) | Kind of monomer | (wt %) | Kind of monomer | (wt %) | | |
| Example 1 | 2EHA *1 | 60.0 | St *4 | 30.0 | DVB *6 | 10.0 | 32.9 | 1.6 |
| Example 2 | 2EHMA *2 | 60.0 | St | 34.0 | DVB | 6.0 | 30.5 | 1.3 |

TABLE 1-continued

Antiblocking agent (ABA)

Composition of crosslinked polymer bead

| | Radically polymerizable monomer unit (1) | | Radically polymerizable monomer unit (2) | | Crosslinking monomer unit (3) | | Critical surface tension (dyne/cm) | Weight average particle diameter ($\mu$m) |
|---|---|---|---|---|---|---|---|---|
| | Kind of monomer | (wt %) | Kind of monomer | (wt %) | Kind of monomer | (wt %) | | |
| Example 3 | 2EHA | 5.0 | St/MMA *5 | 72.0/ 19.0 | DVB | 4.0 | 39.1 | 1.2 |
| Example 4 | ODMA *3 | 60.0 | St | 36.0 | DVB | 4.0 | 26.2 | 0.9 |
| Example 5 | 2EHA/ 2EHMA | 7.0/ 53.0 | St | 34.0 | DVB | 6.0 | 31.2 | 1.2 |
| Comparative Example 1 | — | — | St | 96.0 | DVB | 4.0 | 36.7 | 1.2 |
| Comparative Example 2 | — | — | MMA | 90.0 | TMPTMA *7 | 10.0 | 46.4 | 2.3 |
| Comparative Example 3 | — | — | St/MMA | 24.0/ 72.0 | DVB | 4.0 | 46.0 | 1.9 |

Description of abbreviation for monomer units
*1. 2EHA: 2-ethylhexyl acrylate
*2. 2EHMA: 2-ethylhexyl methacrylate
*3. ODMA: Octadecyl methacrylate
*4. St: Styrene
*5. MMA: Methyl methacrylate
*6. DVB: Divinylbenzene
*7: TMPTMA: Trimethylolpropane trimethacrylate

TABLE 2

| | | | Oriented film | | | |
|---|---|---|---|---|---|---|
| | Amounts of ABA (parts by weight) | Haze (%) | LSI (%) | Slipperiness $\mu$s | Slipperiness $\mu$k | Antiblocking property (kg/20 cm$^2$) |
| Example 1 | 0.4 | 3.1 | 1.3 | 0.25 | 0.19 | 0.45 |
| Example 2 | 0.4 | 3.1 | 2.0 | 0.23 | 0.18 | 0.41 |
| Example 3 | 0.2 | 2.4 | 1.1 | 0.36 | 0.26 | 0.54 |
| Example 4 | 0.4 | 1.9 | 1.6 | 0.29 | 0.27 | 0.86 |
| Example 5 | 0.4 | 3.8 | 1.9 | 0.25 | 0.16 | 0.29 |
| Comparative Example 1 | 0.3 | 4.6 | 1.8 | 0.16 | 0.18 | 0.29 |
| Comparative Example 2 | 0.2 | 4.4 | 17.0 | 0.40 | 0.30 | 0.85 |
| Comparative Example 3 | 0.4 | 5.9 | 7.4 | 0.23 | 0.20 | 0.28 |

As mentioned above, the polyolefin resin composition according to the present invention gives an oriented film which is excellent in transparency, slipperiness and antiblocking property.

The oriented film provided by the present invention can be used in wide application including food packing, fiber packing and the like making good use of its excellent transparency.

What is claimed is:

1. An oriented polyolefin resin film obtained by orienting a sheet of a polyolefin resin composition at least in a uniaxial direction, wherein said polyolefin resin composition comprises:
   (a) 100 parts by weight of a polyolefin resin; and
   (b) 0.05 to 1 part by weight of beads of a crosslinked polymer comprising (1) 5 to 99% by weight of a first monomer unit derived from a radically polymerizable monomer represented by the general formula (A):

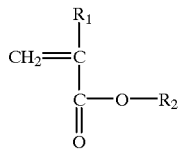

(A)

wherein R$_2$ is hydrogen or a hydrocarbon group having 1 to 5 carbon atoms and R$_2$ is a hydrocarbon group having 5 to 30 carbon atoms, (2) 0 to 94% by weight of a second monomer unit derived from a radically polymerizable monomer other than the monomer unit of the general formula (A) wherein said second monomer unit contains radically polymerizable group, and (3) 1 to 20% by weight of a third monomer unit derived from a crosslinkable monomer wherein said third monomer unit contains at least two vinyl groups, said crosslinked polymer beads having a critical surface tension of 40 dyne/cm or less.

2. An oriented polyolefin resin film according to claim 1, wherein the polyolefin resin is a polypropylene resin.

3. An oriented polyolefin resin film according to claim 1, wherein the weight average diameter of the crosslinked polymer beads is 0.5 to 5 $\mu$m.

4. An oriented polyolefin resin film according to claim 1, wherein the crosslinked polymer comprises (1) 5 to 80% by weight of the first monomer unit derived from the radically polymerizable monomer represented by the general formula (A), (2) 0 to 85% by weight of the second monomer unit derived from the radically polymerizable monomer other than the monomer unit of the general formula (A), and (3) 2 to 15% by weight of the third monomer unit derived from the crosslinkable monomer.

5. An oriented polyolefin resin film according to claim 1, wherein the crosslinked polymer comprises (1) 5 to 60% by weight of the first monomer unit derived from the radically polymerizable monomer represented by the general formula (A), (2) 0 to 75% by weight of the second monomer unit derived from the radically polymerizable monomer other than the monomer unit of the general formula (A), and (3) 2 to 10% by weight of the third monomer unit derived from the crosslinkable monomer.

6. An oriented polyolefin resin film according to claim 1, wherein the polymer beads have a critical surface tension of 20 to 38 dyne/cm.

7. An oriented polyolefin resin film according to claim 1, wherein the polymer beads have a critical surface tension of 25 to 35 dyne/cm.

8. An oriented polyolefin resin film according to claim 1, wherein $R_1$ is hydrogen or a hydrocarbon group having 1 to 3 carbon atoms; and $R_2$ is a hydrocarbon group having 5 to 20 carbon atoms.

9. An oriented polyolefin resin film according to claim 1, wherein $R_1$ is hydrogen or methyl; $R_2$ is a hydrocarbon group having 5 to 10 carbon atoms.

10. An oriented polyolefin resin film according to claim 1, wherein the first monomer unit is selected from the group consisting of 2-ethylhexyl acrylate, 2-ethylhexyl methacrylate, pentyl methacrylate, hexyl methacrylate, heptyl methacrylate, octyl methacrylate, nonyl methacrylate, isodecyl methacrylate, phenyl methacrylate, cyclohexyl acrylate, octadecyl methacrylate, and combinations thereof; and wherein the second monomer unit is selected from the group consisting of styrene, methyl acrylate and methyl methacrylate.

11. An oriented polyolefin resin film according to claim 1, wherein the first monomer unit is selected from the group consisting of 2-ethylhexyl acrylate and 2-ethylhexyl methacrylate; and wherein the second monomer unit is selected from the group consisting of styrene, methyl acrylate and methyl methacrylate.

12. An oriented polyolefin resin film according to claim 1, wherein the third monomer unit is selected from the group consisting of divinylbenzene, ethylene glycol dimethacrylate, and trimethylolpropane trimethacrylate.

13. An oriented polyolefin resin film according to claim 11, wherein the third monomer unit is selected from the group consisting of divinylbenzene, ethylene glycol dimethacrylate, and trimethylolpropane trimethacrylate.

* * * * *